US006993234B1

(12) United States Patent
Sigalas et al.

(10) Patent No.: US 6,993,234 B1
(45) Date of Patent: Jan. 31, 2006

(54) PHOTONIC CRYSTAL RESONATOR APPARATUS WITH IMPROVED OUT OF PLANE COUPLING

(75) Inventors: Mihail Sigalas, Santa Clara, CA (US); Annette Grot, Cupertino, CA (US); Laura Mirkarimi, Sunol, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/910,216

(22) Filed: Aug. 3, 2004

(51) Int. Cl.
*G02B 6/00* (2006.01)
*G02B 6/10* (2006.01)
*G02B 6/12* (2006.01)

(52) U.S. Cl. .................. 385/129; 385/14; 385/122; 385/130; 385/131

(58) Field of Classification Search .................. None
See application file for complete search history.

(56) References Cited

U.S. PATENT DOCUMENTS

| | | | | |
|---|---|---|---|---|
| 6,687,447 | B2 * | 2/2004 | Flory et al. ................ | 385/129 |
| 6,775,430 | B2 * | 8/2004 | Flory et al. ................ | 385/16 |
| 2002/0159216 | A1 * | 10/2002 | Ennis ...................... | 361/234 |
| 2002/0159733 | A1 * | 10/2002 | Flory et al. ................ | 385/125 |
| 2004/0126055 | A1 * | 7/2004 | Flory et al. ................ | 385/16 |

OTHER PUBLICATIONS

Asano, T.; Mochizuki, M.; Noda, S.; Okano, M. and Imada, M.; "A Channel Drop Filter Using a Single Defect in a 2-D Photonic Crystal Slab—Defect Engineering With Respect to Plarization Mode and Ratio of Emissions From Upper and Lower Slides"; Journal Of Lightwave Technology, vol. 21, No. 5, May 2003, pp. 1370-1376.

Akahane, Y.; Mochizuki, M.; Asano, T.; Tanaka, Y. and Noda, S.; "Design of a Channel Drop Filter by Using a Donor-Type Cavity With High-Quality Factor in a Two-Dimensional Photonic Crystal Slab"; Applied Physics Letters; vol. 82, No. 9; Mar. 3, 2003, pp. 1341-1343.

Asano, T.; Song, B.; Tanaka, Y. and Noda, S.; Investigation of a Channel-Add/Drop-Filtering Device Using Acceptor-Type Point Defects in a Two-Dimensional Photonic-Crystal Slab; Applied Physics Letters; vol. 83, No. 3; Jul. 21, 2003, pp. 407-409.

* cited by examiner

*Primary Examiner*—Frank G. Font
*Assistant Examiner*—Mary El-Shammaa

(57) ABSTRACT

A two-dimensional photonic crystal resonator apparatus in which the power of light coupled out of the apparatus in one direction is greater than the power of light coupled out of the apparatus in the opposite direction The apparatus has a photonic crystal slab waveguide structure having a waveguide and a resonator in the vicinity of the waveguide such that light propagated through the waveguide is extracted from the waveguide through the resonator and is coupled out of the plane of the apparatus. The apparatus has upper and lower cladding layers on the photonic crystal slab waveguide structure having different indices of refraction, and the power of light coupled out of the apparatus in the direction of the cladding layer having the higher index of refraction is greater than the power of the light coupled out of the apparatus in the direction of the cladding layer having the lower index of refraction.

20 Claims, 3 Drawing Sheets

PHOTONIC CRYSTAL RESONATOR APPARATUS WITH IMPROVED OUT OF PLANE COUPLING

DESCRIPTION OF RELATED ART

Photonic crystals are periodic dielectric structures that can prohibit the propagation of light in certain frequency ranges. In particular, photonic crystals are structures that have spatially periodic variations in refractive index; and with a sufficiently high refractive index contrast, photonic bandgaps can be opened in the structures' optical transmission characteristics. A "photonic bandgap" is a frequency range within which propagation of light through a photonic crystal is prevented.

A photonic crystal that has spatial periodicity in three dimensions can prevent the propagation of light having a frequency within the crystal's photonic bandgap in all directions, however, the fabrication of a three-dimensional structure is often technically challenging. An alternative is to utilize a two-dimensional photonic crystal slab that has a two dimensional periodic lattice incorporated within it. In a two-dimensional photonic crystal slab, light propagating in the slab is confined in the direction perpendicular to a major surface of the slab via total internal reflection, and light propagating in the slab in directions other than perpendicular to a major surface is controlled by properties of the photonic crystal slab. In a two-dimensional photonic crystal slab, light propagating in the slab in directions other than perpendicular to a slab face and having a frequency within a photonic bandgap of the slab will not propagate through the slab, while light having a frequency outside the photonic bandgap is transmitted through the slab unhindered. In addition to being easier to fabricate, two-dimensional photonic crystal slabs provide the advantage that they are compatible with the planar technologies of standard semiconductor processing.

It is known that the introduction of defects in the periodic lattice of a photonic crystal allows the existence of localized electromagnetic states that are trapped at the defect site, and that have resonant frequencies within the bandgap of the surrounding photonic crystal material. By providing a line of such defects in a two-dimensional photonic crystal slab, a two-dimensional photonic crystal slab waveguide is created that can be used in the control and guiding of light. In a two-dimensional photonic crystal slab waveguide, light of a given frequency that would otherwise be prevented from propagating in the photonic crystal slab may propagate in the defect region of the slab.

A two-dimensional photonic crystal resonator apparatus can be formed by providing a resonator in the form of a resonant chamber in a two-dimensional photonic crystal slab waveguide. One implementation of a two-dimensional photonic crystal resonator apparatus is as an add-drop device wherein light of a particular frequency propagating along the waveguide couples to the resonator, and from the resonator, couples out of the plane of the apparatus (see "Investigation of a channel-add/drop filtering device using acceptor-type point defects in a two-dimensional photonic crystal slab", Takashi Asano et al., Applied Physics Letters, Vol. 83, No. 3, pages 407409, 2003). The light coupled out of the plane of the apparatus is light that is extracted from the light propagating along the waveguide and the extracted light can, for example, be redirected to a second waveguide for utilization in various applications.

One example of a known two-dimensional photonic crystal resonator apparatus implemented as an add-drop device is fabricated from a bulk material having a periodic lattice of circular air-filled columns, referred to as "holes", extending through the bulk material in a height direction and periodic in the planar direction. One line of the holes is omitted to provide a waveguide having a narrow frequency width. For two-dimensional photonic crystal membrane structures comprised of a high refractive index photonic crystal slab having air cladding layers both above and below the slab, the output power splits equally well from above and below such that 50 percent of the output power goes to the top of the slab, and 50 percent of the power goes to the bottom of the slab.

In a photonic crystal resonator apparatus implemented as an add-drop device, however, it is desirable to maximize the output power of the light extracted from the apparatus in one direction at the expense of the light extracted from the apparatus in the opposite direction so that the extracted light can be more efficiently used. Although it has been suggested that the light extracted from the waveguide can be increased in one direction by providing an asymmetry in the photonic crystal slab, such a structure is very difficult to fabricate (see "Design of a channel drop filter by using a donor-type cavity with high-quality factor in a two-dimensional photonic crystal slab", Yoshihiro Akahane et al., Applied Physics Letters, Vol. 82, No. 9, pages 1341–1343, 2003).

SUMMARY OF THE INVENTION

In accordance with the invention, a two-dimensional photonic crystal resonator apparatus is provided in which the power of light coupled out of the apparatus in one direction is greater than the power of light coupled out of the apparatus in the opposite direction. The apparatus has a photonic crystal slab waveguide structure having a waveguide and a resonator in the vicinity of the waveguide such that light propagated through the waveguide is extracted from the waveguide through the resonator and is coupled out of the plane of the apparatus. The apparatus has upper and lower cladding layers on the photonic crystal slab waveguide structure having different indices of refraction, and the power of light coupled out of the apparatus in the direction of the cladding layer having the higher index of refraction is greater than the power of the light coupled out of the apparatus in the direction of the cladding layer having the lower index of refraction.

BRIEF DESCRIPTION OF THE DRAWINGS

Furthermore, the invention provides embodiments and other features and advantages in addition to or in lieu of those discussed above. Many of these features and advantages are apparent from the description below with reference to the following drawings.

FIG. 1b is a graph that shows light transmission characteristics of the photonic crystal resonator apparatus of FIG. 1a;

FIG. 3b is a graph that shows light transmission characteristics of the photonic crystal resonator apparatus of FIG. 3a;

DETAILED DESCRIPTION OF THE EXEMPLARY EMBODIMENTS OF THE INVENTION

Embodiments in accordance with the invention provide a two-dimensional photonic crystal resonator apparatus and a method for fabricating a two-dimensional photonic crystal resonator apparatus.

Figure 1A:
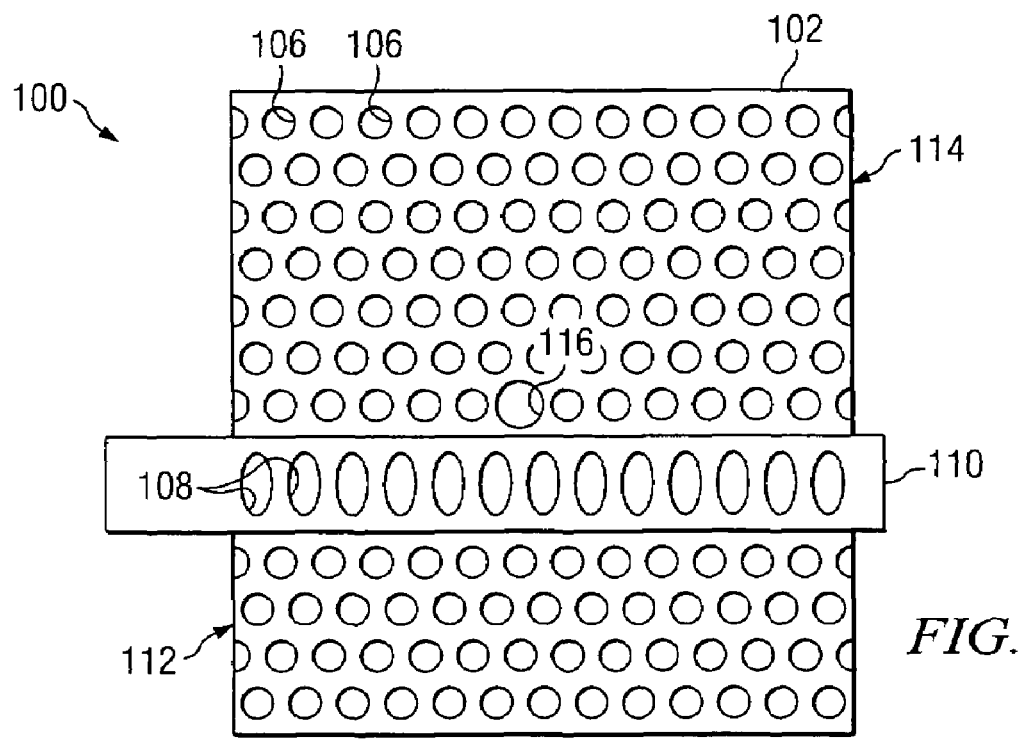
FIG. 1a is a schematic cross-sectional top view that illustrates a two-dimensional photonic crystal resonator apparatus according to an exemplary embodiment of the invention.

FIG. 1a is a schematic cross-sectional top view that illustrates a two-dimensional photonic crystal resonator apparatus according to an exemplary embodiment in accordance with the invention. The apparatus is generally designated by reference number 100 and comprises a Si photonic crystal slab 102 having a periodic lattice formed by an array of circular air holes 106 extending through slab 102 from a top surface to a bottom surface thereof. One line of elliptical air holes 108 is provided in slab 102 to define waveguide 110 that extends through slab 102 from input end 112 to output end 114 thereof. In addition, an enlarged circular air hole is provided in slab 102 in the vicinity of waveguide 110 to provide a resonant chamber defining resonator 116.

In the exemplary embodiment in accordance with the invention illustrated in FIG. 1a, circular air holes 106 each have a radius of r=0.29a (a is the lattice constant). The thickness of Si slab 102 is t=0.6a. Elliptical air holes 108 have a short axis of 0.66a and an ellipticity of 2.236. Resonator 116 has a radius of r=0.41a. The Si slab is placed on a $SiO_2$ substrate (not shown in FIG. 1a) as is typical in most two-dimensional photonic crystal devices because photonic crystal membrane structures are difficult to fabricate and are usually quite fragile. The $SiO_2$ substrate (refractive index 1.414) functions as a lower cladding layer of the apparatus, and the upper cladding layer of the apparatus is air (refractive index 1.0).

Figure 1B:
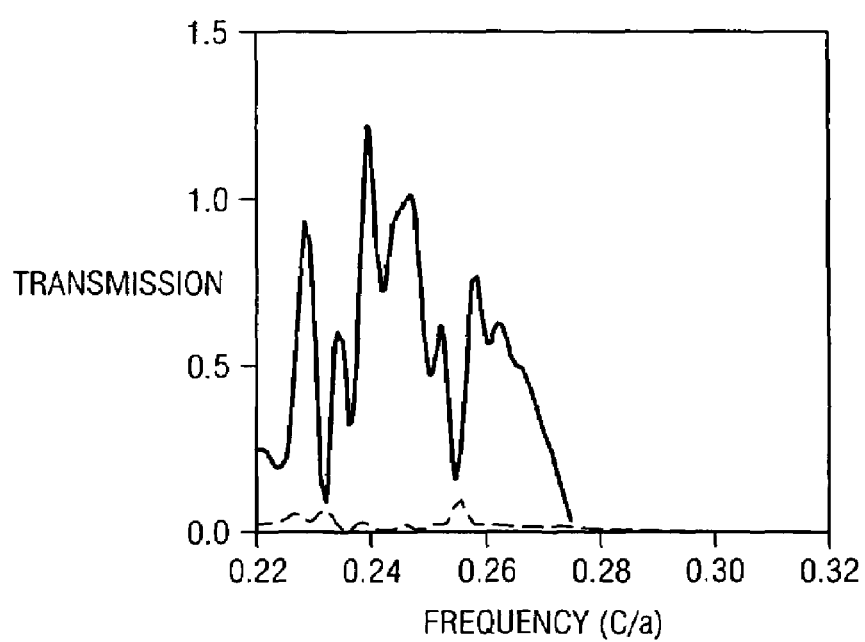

FIG. 1b is a graph that shows light transmission characteristics of photonic crystal resonator apparatus 1100 of FIG. 1a. A three-dimensional finite difference time domain method was used to calculate the light transmission along waveguide 110, and the power leaking out of plane of apparatus 100 through resonator 116. As shown in FIG. 1b, at the resonance frequency of resonator 116 (0.254c/a), there is an 8 dB drop of the light transmission along waveguide 110, and a peak on the transmitted power leaking out of the plane of photonic crystal slab 102. Eight percent of the power goes to the $SiO_2$ substrate functioning as a lower cladding layer of the apparatus and seven percent of the power leaks to air functioning as an upper cladding layer of the apparatus. Thus, in two-dimensional photonic crystal resonator apparatus 100, there is a slight increase in the light transmission through the higher index of refraction $SiO_2$ substrate relative to the light transmission to the lower index of refraction air.

Figure 2:
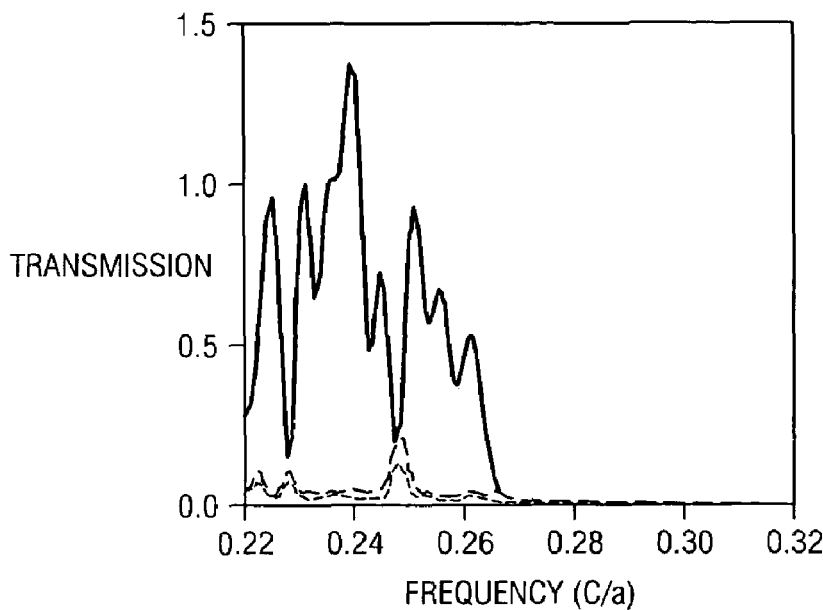
FIG. 2 is a graph that shows light transmission characteristics of the two-dimensional photonic crystal resonator apparatus of FIG. 1a modified to include a $Si_3N_4$ upper cladding layer.

Light transmission along one direction can be further increased in the two-dimensional photonic crystal resonator apparatus of FIG. 1a by providing a dielectric slab such as $Si_3N_4$ (refractive index 2) on top of photonic crystal slab 102 as an upper cladding layer for apparatus 100 instead of an air cladding layer. The $SiO_2$ substrate again functions as the lower cladding layer. FIG. 2 is a graph that shows light transmission characteristics of the two-dimensional photonic crystal resonator apparatus of FIG. 1a modified to include a $Si_3N_4$ upper cladding layer. The resonant frequency moves to lower frequencies (0.248c/a) due to the increase in the dielectric constant of the upper cladding layer. As shown in FIG. 2, there is a 7 dB drop of the transmission along the waveguide. Twenty-three percent of the power leaks to the higher index of refraction $Si_3N_4$ upper cladding layer and thirteen percent leaks to the lower index of refraction $SiO_2$ lower cladding layer. Thus, the transmitted power from the $Si_3N_4$ upper cladding layer is almost three times higher than in the case of an air upper cladding layer.

There is an optimum ratio of the index of refraction between the upper and lower cladding layers of two-dimensional photonic crystal resonator apparatus 100 to effectively increase the transmission power in one direction out of the plane of photonic crystal slab 102. The optimum ratio to effectively increase the transmission power from the upper cladding layer depends on the particular defect configuration, the waveguide geometry, the radius of the circular air holes, and the thickness and the refractive index of photonic crystal slab 102. The refractive index of the upper cladding layer should be higher than the refractive index of the lower cladding layer and lower than the refractive index of the photonic crystal slab.

Figure 3A:
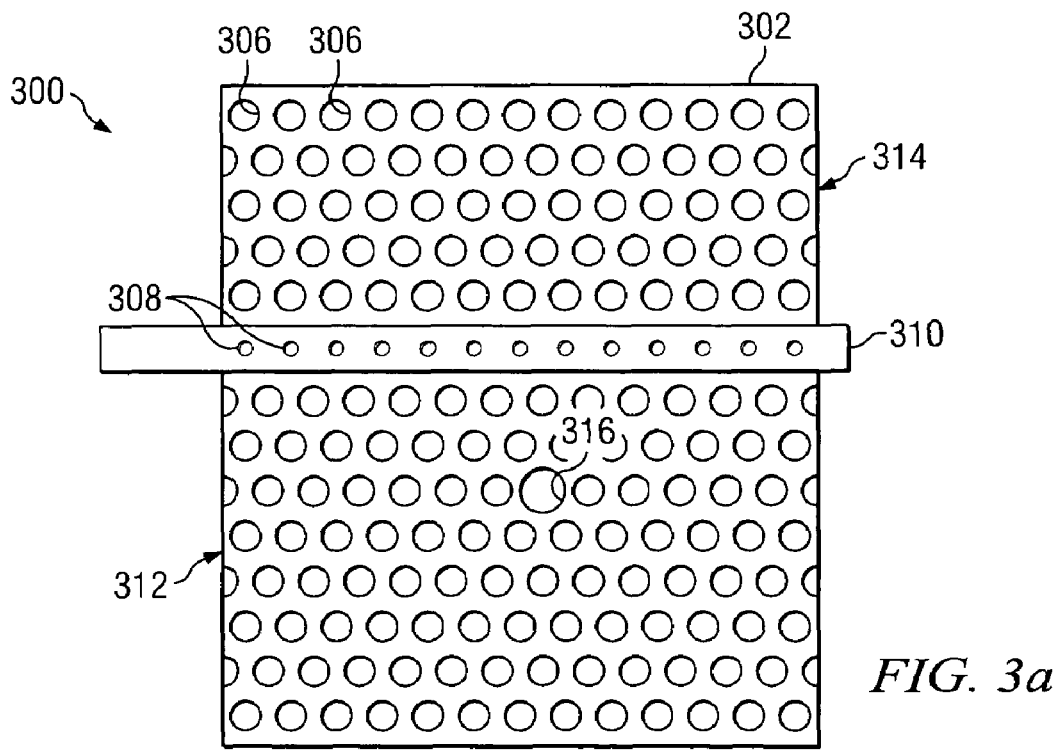
FIG. 3a is a schematic cross-sectional top view that illustrates a two-dimensional photonic crystal resonator apparatus according to a further exemplary embodiment of the invention.

FIG. 3a is a schematic top cross-sectional view that illustrates a photonic crystal resonator apparatus according to a further exemplary embodiment in accordance with the invention. The apparatus is generally designated by reference number 300 and comprises a Si photonic crystal slab 302 having a periodic lattice formed by an array of circular air holes 306 extending through slab 302 from a top surface to a bottom surface thereof, and having a radius of 0.29a. A waveguide 310 extends through slab 302 from input end 312 to output end 314 and is formed by a line of air holes 308 having a radius of 0.1a. A circular air hole having a radius of 0.59a is also provided in slab 302 to define resonator 316. Photonic crystal slab 302 was placed on top of a relatively low index of refraction material such as $SiO_2$ (refractive index 0.1.414) to function as a lower cladding layer (not shown). The upper cladding layer was air (refractive index 1.0).

Figure 3B:
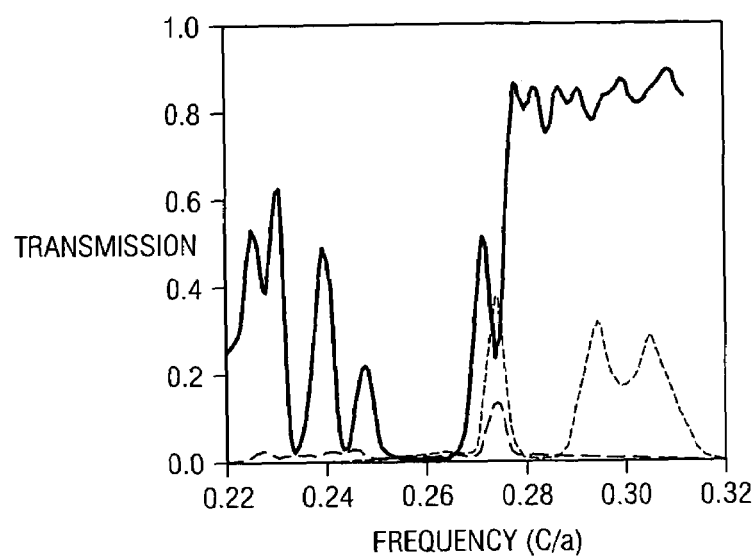

FIG. 3b is a graph that shows the light transmission characteristics of photonic crystal resonator apparatus 300 of FIG. 3a. In particular, FIG. 3a shows the transmission along the waveguide and the transmitted power leaking to the substrate through resonator 316, and the transmitted power leaking to the air through resonator 316. The resonance frequency is at $a/\lambda=0.274$ and most of the power leaks to the lower cladding layer that has a higher index of refraction than the upper air cladding layer.

Figure 4:
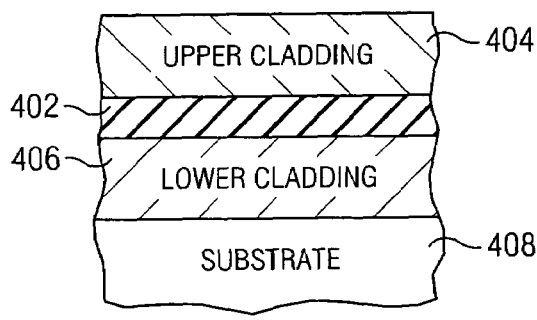
FIG. 4 is a schematic cross-sectional side view that illustrates a two-dimensional photonic crystal resonator apparatus according to a further exemplary embodiment of the invention.

FIG. 4 is a schematic cross-sectional side view that illustrates a two-dimensional photonic crystal resonator apparatus according to a further exemplary embodiment in accordance with the invention. The apparatus is generally designated by reference number 400, and includes photonic crystal slab waveguide 402, for example, photonic crystal slab waveguide 102 illustrated in FIG. 1a, upper cladding layer 404, lower cladding layer 406 and substrate 408. Photonic crystal slab waveguide 402 comprises a single crystalline material having a high index of refraction (n=3 to 4) such as Si, Ge or a compound semiconductor such as GaAs and InP. For a Si photonic crystal slab waveguide, lower cladding layer 406 comprises a material having an index of refraction of approximately 1.5 such as $SiO_2$ or spin on glass. The refractive index of upper cladding layer 404 is higher than the index of refraction of lower cladding layer 406 and lower than the index of refraction of slab waveguide 402.

The upper cladding layer can, for example, be $Si_3N_4$ which has a refractive index of 1.9. Other materials that can also be used for upper cladding layer 406 include MgO (n=1.8), $Al_2O_3$ (n=1.76), $ZrSiO_4$ (n=1.95), SrO (n~2.0), $Ta_2O_5$ (n=2.2), $Sr_xBa_{(1-x)}TiO_3$ (n=2.2) and $TiO_2$ (n=2.4–2.7).

For compound semiconductor devices, lower cladding layer 406 can be $Al_2O_3$ due to the ease of formation of epitaxial layers with aluminum containing compounds which are later controllably oxidized to form $Al_2O_3$. In this exemplary embodiment in accordance with the invention, upper cladding layer 404 should have a refractive index higher than $Al_2O_3$ (n=1.76), and in particular, should be a material having a refractive index n>2 such as SrO, $Ta_2O_5$ and $TiO_2$. Substrate 408 is preferably formed of materials such as Si, Ge, GaAs and InP.

Although, in FIG. 4, upper and lower cladding layers are shown as fully covering the upper and lower surfaces of slab waveguide 402, in alternative embodiments, the cladding layers can cover only the portions of the slab waveguide surfaces in the vicinity of the resonator.

Photonic crystal resonator apparatus 400 illustrated in FIG. 4 can be fabricated by being patterned into a resist by using electron beam lithography or another nanolithography technique. The pattern is then transferred into the upper cladding layer by a selective etch technique. The reverse pattern can also be fabricated so that a metal lift-off technique may be used to prepare a hard mask of metal. This may be useful in obtaining good etch selectivity when good etch selectivity does not exist between the resist and the upper cladding layer. After transferring the pattern into the upper cladding layer, a selective etch is used to etch away the Si without removing the upper cladding layer.

Figure 5:
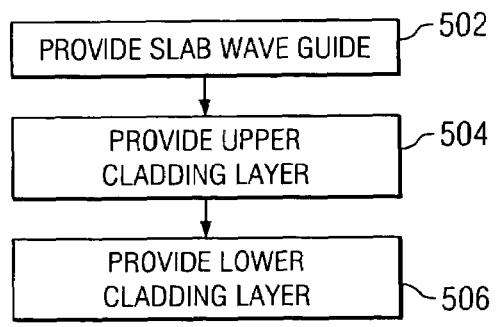
FIG. 5 is a flowchart that illustrates a method for fabricating a two-dimensional photonic crystal resonator apparatus according to a further exemplary embodiment of the invention.

FIG. 5 is a flow chart that illustrates a method for fabricating a two-dimensional photonic crystal resonator apparatus according to a further exemplary embodiment in accordance with the invention. The method is generally designated by reference number 500 and includes providing a photonic crystal slab waveguide structure having a waveguide and a resonator in the vicinity of the waveguide (step 502). An upper cladding layer having a first index of refraction and that covers at least a portion of an upper surface of the photonic crystal slab waveguide in the vicinity of the resonator is provided (step 504). A lower cladding layer having a second index of refraction different from the first index of refraction and that covers at least a portion of a lower surface of the photonic crystal slab waveguide in the vicinity of the resonator is also provided (step 506) to complete the apparatus.

While what has been described constitute exemplary embodiments in accordance with the invention, it should be recognized that the invention can be varied in numerous ways without departing from the scope thereof. Because embodiments in accordance with the invention can be varied in numerous ways, it should be understood that the invention should be limited only in so far as is required by the scope of the following claims.

We claim:

1. A two-dimensional photonic crystal resonator apparatus, comprising:
   a photonic crystal slab waveguide structure, the photonic crystal slab waveguide structure having a waveguide and a resonator in the vicinity of the waveguide;
   a first cladding layer having a first index of refraction on at least a portion of a first surface of the photonic crystal slab waveguide structure; and
   a second cladding layer having a second index of refraction higher than the first index of refraction on at least a portion of a second surface of the photonic crystal slab waveguide structure such that a second power of light coupled out of the apparatus through the second cladding is greater than a first power of light coupled out of the apparatus through the first cladding layer.

2. The apparatus according to claim 1, wherein the waveguide comprises a line of non-circular shaped holes.

3. The apparatus according to claim 2, wherein the line of non-circular shaped holes comprises a line of elliptically-shaped holes.

4. The apparatus according to claim 3, wherein the first cladding layer comprises $SiO_2$ and the second cladding layer comprises $Si_3N_4$.

5. The apparatus according to claim 4, wherein the photonic crystal slab waveguide structure comprises Si.

6. The apparatus according to claim 5, wherein the first cladding layer comprises a lower cladding layer on at least a portion of a lower surface of the photonic crystal slab waveguide structure in the vicinity of the resonator, wherein the second cladding layer comprises an upper cladding layer on at least a portion of an upper surface of the photonic crystal slab waveguide structure in the vicinity of the resonator, and wherein the second power of light coupled out of the apparatus through the upper cladding layer is greater than the first power of light coupled out of the apparatus through the lower cladding layer.

7. The apparatus according to claim 1, wherein the photonic crystal slab waveguide structure has an index of refraction that is higher than the second index of refraction.

8. The apparatus according to claim 1, wherein the photonic crystal slab waveguide structure further includes an array of circular-shaped holes defining a periodic lattice of the photonic crystal slab waveguide structure.

9. The apparatus according to claim 1, wherein the waveguide comprises a line of circular-shaped holes having a radius less than a radius of the circular-shaped holes defining a periodic lattice of the photonic crystal slab waveguide structure.

10. The apparatus according to claim 9, wherein the first cladding layer is air and the second cladding layer is $SiO_2$.

11. The apparatus according to claim 1, wherein the two-dimensional photonic crystal resonator apparatus comprises an add-drop device.

12. The apparatus according to claim 1, wherein the first and second cladding layers cover at least portions of the first and second surfaces respectively, of the photonic crystal slab waveguide structure in the vicinity of the resonator.

13. The apparatus according to claim 12, wherein the first and second cladding layers fully cover the first and second surfaces, respectively, of the photonic crystal slab waveguide structure.

14. A two-dimensional photonic crystal resonator apparatus, comprising:
   a photonic crystal slab waveguide structure, the photonic crystal slab waveguide structure having a first index of refraction and including a waveguide comprising a line of air holes and a resonator in the vicinity of the waveguide;

a first cladding-layer having a second index of refraction on at least a portion of a first surface of the photonic crystal slab waveguide structure in the vicinity of the resonator; and a second cladding layer having a third index of refraction that is lower than the first index of refraction and higher than the second index of refraction on at least a portion of a second surface of the photonic crystal slab waveguide structure in the vicinity of the resonator such that a second power of light coupled out of the apparatus through the second cladding layer is greater than a first power of light coupled out of the apparatus through the first cladding layer.

15. The apparatus according to claim 14, wherein the photonic crystal slab wave guide structure further includes an array of circular-shaped holes defining a periodic lattice of the photonic crystal slab waveguide structure, and wherein the waveguide comprises a line of elliptically-shaped holes.

16. The apparatus according to claim 14, wherein the photonic crystal slab waveguide structure further includes an array of circular-shaped holes defining a periodic lattice of the photonic crystal slab waveguide structure, and wherein the waveguide comprises a line of circular-shaped holes having a radius that is less than the radius of the circular-shaped holes defining the periodic lattice.

17. A method for fabricating a two-dimensional photonic crystal resonator apparatus, comprising:

providing a photonic crystal slab waveguide structure having a waveguide and a resonator in the vicinity of the waveguide;

providing a first cladding layer having a first index of refraction on at least a portion of a first surface of the photonic crystal slab waveguide structure; and providing a second cladding layer having a second index of refraction higher than the first index of refraction on at least a portion of a second surface of the photonic crystal slab waveguide structure such that a second power of light coupled out of the apparatus through the second cladding layer is greater than a first power of light coupled out of the apparatus through the first cladding layer.

18. The method according to claim 17, wherein the waveguide comprises a line of elliptically-shaped holes.

19. The method according to claim 17, wherein the photonic crystal slab waveguide structure further includes an array of circular-shaped holes defining a periodic lattice of the photonic crystal slab waveguide structure, and wherein the waveguide comprises a line of circular-shaped holes having a radius that is less than the radius of the circular-shaped holes defining the periodic lattice.

20. The method according to claim 17, wherein the photonic crystal slab waveguide structure has an index of refraction that is higher than the second index of refraction.

* * * * *